US005589779A

United States Patent [19]
Micko

[11] Patent Number: 5,589,779
[45] Date of Patent: Dec. 31, 1996

[54] POTENTIOMETER CIRCUIT PROVIDING IDENTIFIABLE OPEN WIPER SIGNALS

[75] Inventor: Eric S. Micko, Rescue, Calif.

[73] Assignee: Qualimetrics, Inc., Sacramento, Calif.

[21] Appl. No.: 184,980

[22] Filed: Jan. 24, 1994

[51] Int. Cl.$^6$ .................................................. G01R 27/08
[52] U.S. Cl. .................. 324/714; 340/870.38; 73/170.09
[58] Field of Search ........................ 324/714; 73/170.01, 73/170.09; 340/870.38, 672, 671; 116/35 R, 46

[56] References Cited

U.S. PATENT DOCUMENTS

| | | | |
|---|---|---|---|
| 1,601,766 | 10/1926 | Peter | 73/170.09 |
| 3,727,457 | 4/1973 | Gregory | 73/170.09 |
| 3,812,712 | 5/1974 | Hoffman | 340/870.38 |
| 3,827,037 | 7/1974 | Willoughby | 340/870.38 |
| 4,803,420 | 2/1989 | Steinbrecher | 340/870.38 |

FOREIGN PATENT DOCUMENTS

| | | | |
|---|---|---|---|
| 3127827 | 2/1983 | Germany | 73/170.01 |
| 363085314 | 4/1988 | Japan | 324/714 |

Primary Examiner—Maura K. Regan
Attorney, Agent, or Firm—Fliesler, Dubb, Meyer & Lovejoy

[57] ABSTRACT

A circuit is provided for generating a voltage signal corresponding to a wiper position in a linear or circular potentiometer having an open wiper position or an open wiper angle, respectively. The voltage signal circuit includes provisions for determining when a wiper is in an open wiper position or angle region. When the circuit is used with a freely rotating circular potentiometer, the voltage signal may be used to determine wind direction. The circuit includes a voltage source coupled to a conducting element and a wiper. A pulling resistor driven by an operational amplifier is coupled to the wiper and voltage source to provide an identifiable voltage signal corresponding to the open wiper state during rotation through the open wiper angle region.

7 Claims, 5 Drawing Sheets

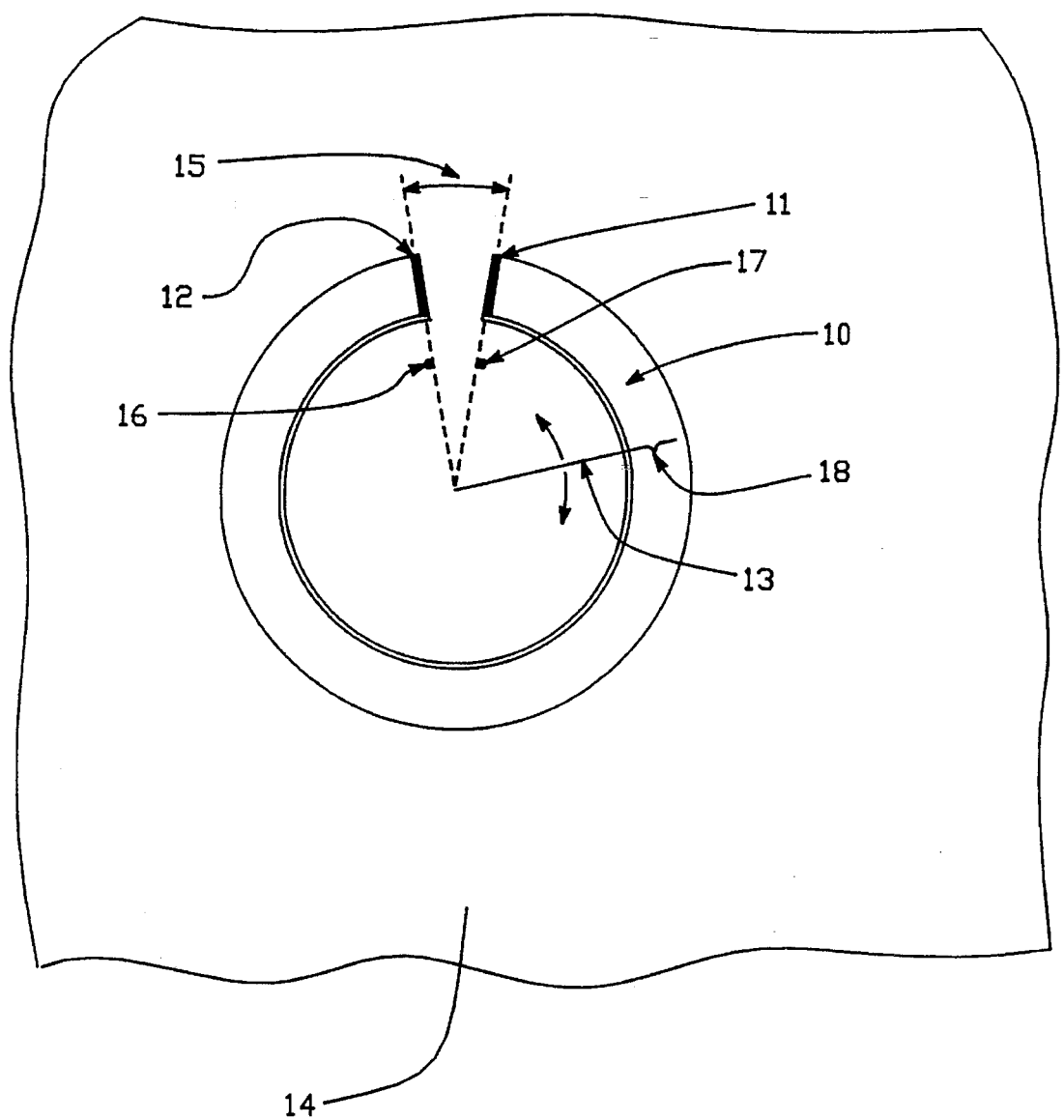
(PRIOR ART)
FIG.—1

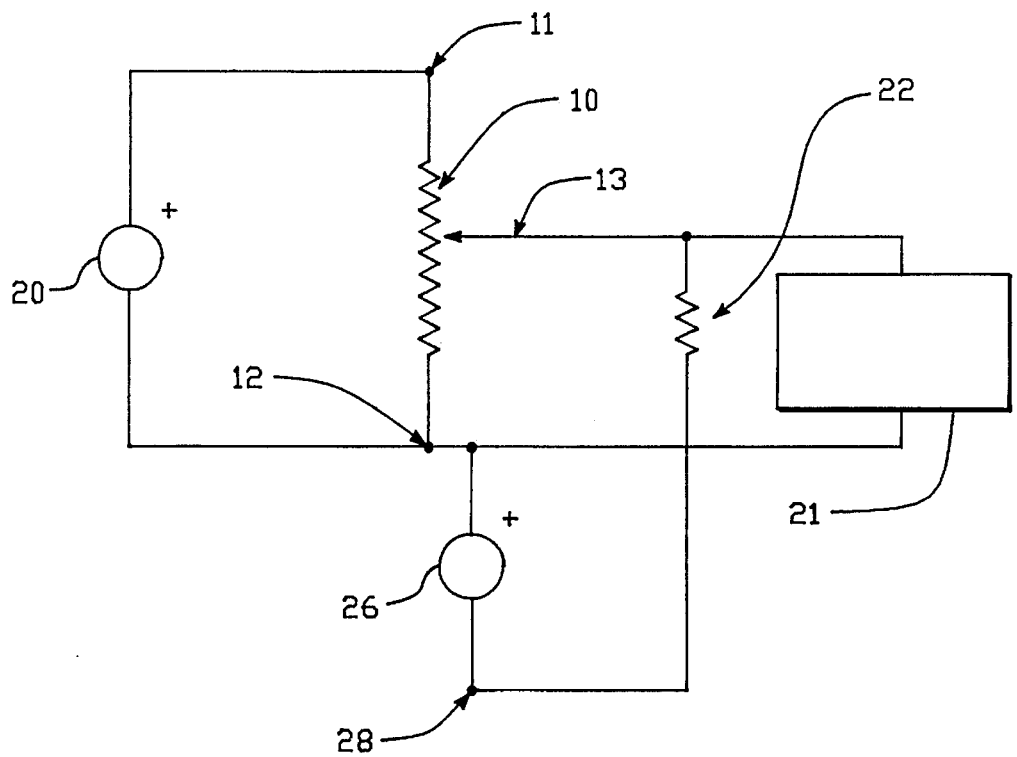
(PRIOR ART)
FIG.—2
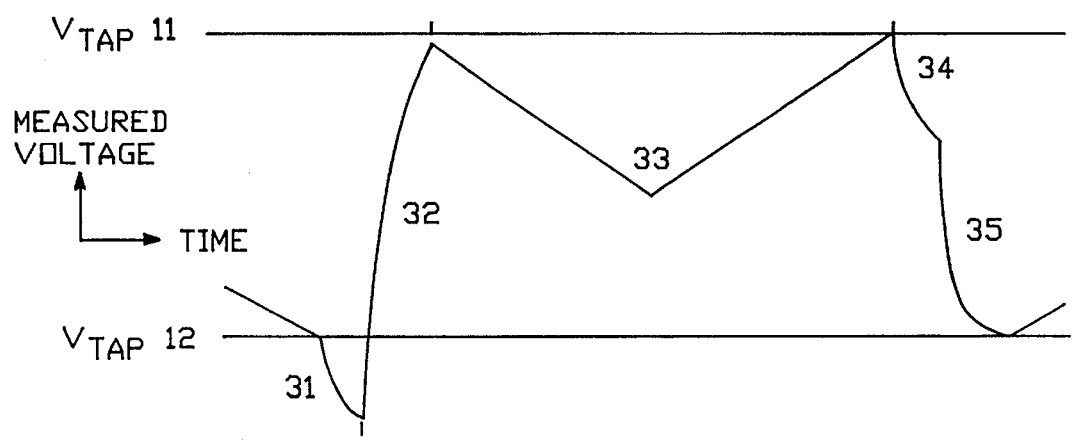
(PRIOR ART)
FIG.—3

POTENTIOMETER CIRCUIT PROVIDING IDENTIFIABLE OPEN WIPER SIGNALS

BACKGROUND OF THE INVENTION

1. Field of the Invention

This invention relates to circuits providing position information. In particular, this invention relates to linear and circular potentiometers providing a signal corresponding to position information.

2. Description of the Related Art

As seen in FIG. 1, a typical circular potentiometer consists of an element 10, tap 11, tap 12 and a wiper 13. Element 10 is a substance of known electrical conductivity, usually of much greater length than width, which is coupled to an electrically insulating substrate 14. Tap 11 and tap 12 are positioned at each end of element 10. Wiper 13 has one end coupled to a rotational center defined by the circular form of element 10. Wiper 13 is a rotatable electrically conducting member allowed to have wiper contact 18 move from, at least, tap 11 to tap 12. As wiper 13 rotates, wiper contact 18 is electrically connected to element 10.

A potentiometer is often used for providing position information by using a voltage source. A fixed voltage source is applied between tap 11 and tap 12 and then a voltage is obtained between either tap 11 or tap 12 and wiper contact 18. As wiper contact 18 is moved along element 10, the voltage between either tap 11 or tap 12 and wiper contact 18 changes as a function of the radial distance between wiper contact 18 and either tap 11 or tap 12. If element 10 is of a uniform resistance per unit length, then the voltage is a linear function of wiper contact 18 position on element 10.

Because of this convenient linear function, potentiometers may be used as transducers from position to voltage, whenever it is necessary for a system to measure the position of a mechanical device. Frequently, potentiometers are used in meteorological instrumentation systems and, in particular, used in calculating wind direction.

Typically, tap 11 and tap 12 form a small gap or open wiper angle 15. As wiper contact 18 rotates through 360 degrees, it will encounter open wiper angle 15 in which it makes no electrical contact to element 10. When wiper contact 18 is within open wiper angle 15, the potentiometer is considered in an open wiper state.

Some potentiometers incorporate stops, as shown as stop 16 and stop 17 in FIG. 1, which prevent rotation of wiper contact 18 through open wiper angle 15. Other potentiometers, in particular circular potentiometers, because of the mechanical devices to be connected to them, must be able to have wiper contact 18 rotate through open wiper angle 15. For example, wind direction mechanical devices require a freely rotating circular potentiometer which permits a wiper contact 18 rotation through open wiper angle 15.

A circuit for measuring the voltage between wiper contact 18 and either tap 11 or tap 12 (and thus the position) of wiper contact 18 is shown schematically in FIG. 2. Voltage source 20 is coupled to tap 11 and tap 12. Wiper 13 is coupled to voltage sampling measurement device 21 and resistor 22.

When a freely rotating circular potentiometer is used with the circuit shown in FIG. 2, wiper 13 will be in an open wiper angle 15 at least some of the time. Without resistor 22, voltage sampling measurement device 21 will respond to an open wiper state by measuring a voltage which drifts in either a positive or negative direction from the voltage measured just before wiper contact 18 departed from tap 11 or tap 12. The drift may be made definitively unidirectional by connecting a pulling resistor or resistor 22 between wiper 13 and node 28 whose voltage lies outside of the voltage range encompassed by the element, due to the additional voltage source 26.

However, with or without resistor 22, definitive information about the position of wiper 13, and in particular wiper contact 18 position is not available during several types of open or just-closed wiper states. Without using resistor 22, the voltage may drift in any direction; thus, a seemingly normal connected wiper voltage may be erroneously measured while wiper contact 18 is in open wiper angle 15. When resistor 22 is used, the situation is somewhat improved although still not definitive, as the position of wiper contact 18 can only be positively identified in only three out of five possible open or just-closed wiper states.

When using resistor 22, there are five possible open or just-closed states, which can be classified into two types: static states and dynamic states. The one static state is when wiper 13 is indefinitely in an open state. The position of wiper 13 in this state is readily identifiable as being within the open wiper angle. Once the voltage of wiper 13 has stabilized in the open state, the voltage is very clearly seen as being the voltage between tap 12 and node 28, which is a voltage outside of the normal "connected wiper range" (hereinafter called "CWR"), assuming a negligible current flowing in resistor 22. Such a reading is only possible when the wiper is within the open wiper angle.

The four possible dynamic states arise from the fact that voltages and voltage sampling measurement device readings do not change instantaneously. Thus, as the voltage at wiper contact 18 is sampled at various times, measurements may be obtained during brief dynamic states occurring between relatively more stable connected wiper and open wiper states. FIG. 3 shows a typical curve of measured voltage as a function of time for a wiper contact 18 rotation at constant speed, once in each direction through the open wiper angle, using the circuit of FIG. 2.

Segment 31: Wiper contact 18 has departed from element 10 at tap 12. Identifiable: (−) slope; voltage out of CWR Segment 32: Wiper contact 18 has just reached tap 11. Identifiable: high (+) slope.

Segment 33: (the closed wiper state) Wiper contact 18 traces voltages within the CWR on element 10. Direction is reversed while in the CWR. Identifiable: low slope; voltage in CWR.

Segment 34: Wiper contact 18 has departed from element at tap 11. Indeterminate: High and changing (−) slope as in segment 35.

Segment 35: Wiper contact 18 has just reached tap 12. Indeterminate: High and changing (−) slope as in segment 34.

The wiper contact position in segment 34 and segment 35 is difficult to determine because both segments have similar high negative slopes, one of which indicates an open wiper (voltage moving toward node 28); the other of which indicates a wiper just having reached tap 12 (voltage moving toward tap 12). The high negative slopes of segments 34 and 35 could be made distinguishable and thus identifiable, but this would impose constraints on voltage measurement devices, circuitry and cabling. Voltage sampling measurement device 21 would be required to have a greater sampling rate in order to distinguish between the two high and changing negative slopes in segment 34 and segment 35. However, such high rate voltage sampling measurement devices would impose greater system costs. Likewise, length constraints would be imposed on connecting cable between the potentiometer and the voltage source and the voltage sampling measurement device because inherent cable capacitance would affect the slopes in segment 34 and segment 35, and thus the identification of wiper contact 18 position.

Therefore, it is desirable to have a circuit which provides position information of a potentiometer,wiper during all open and just-closed states without requiring expensive and complex circuitry, cabling and measurement devices.

SUMMARY OF THE INVENTION

The present invention provides a circuit comprising a signal source coupled to a first conducting element and a second conducting element. The second conducting element has a first contact coupled to the signal source and has a second contact selectively coupled to the first conducting element. The second conducting element provides a first signal corresponding to an unidentifiable second conducting element second contact position during a decoupling of the second conducting element second contact from the first conducting element. Means for providing a second signal, corresponding to the second conducting element second contact position, during the decoupling is responsive to the first signal.

According to an aspect of the invention, the first conducting element is substantially circular having uniform impedance.

According to another aspect of the invention, the first conducting element first contact and first conducting element second contact form a non-conducting region.

According to another aspect of the invention, the means for providing includes means for sensing the first signal and means for driving the first signal to a reference signal level.

According to another aspect of the invention, the means for driving includes a switch coupled to the signal source providing the reference level.

According to yet another aspect of the invention, the means for providing includes an operational amplifier having a first input coupled to the signal source and a second input coupled to the second conducting element and an output coupled to the signal source.

According to still another aspect of the present invention, a potentiometer comprises a voltage source coupled to a substantially circular conducting element having a first tap and a second tap coupled to the voltage source. The first tap and the second tap form a nonconducting region. A wiper is coupled to the voltage source and is rotatably coupled to the substantially circular conducting element and nonconducting region. The wiper provides a first voltage signal corresponding to an indeterminate wiper position during the coupling of the wiper to the non-conducting region. Means are coupled to the wiper for providing a second voltage signal corresponding to a wiper position responsive to the first voltage signal.

According to still another aspect of the invention, the means for providing includes both means coupled to the wiper for sensing the first voltage signal and means coupled to the sensing means for driving the first voltage signal to a reference voltage.

According to still another aspect of the present invention, a potentiometer providing a wind direction comprises a voltage source coupled to a substantially circular conducting element having a first tap and a second tap coupled to the voltage source. The first tap and the second tap form a non-conducting angle region. A wiper is coupled to the voltage source and rotatably coupled to the substantially circular conducting element and non-conducting angle region. The wiper provides a first voltage signal corresponding to an unidentifiable wiper contact position during the coupling of the wiper to the non-conducting angle region. An operational amplifier has a first input coupled to the voltage source and a second input coupled to the wiper. An operational amplifier output is also coupled to the voltage source providing a second voltage signal corresponding to wind direction.

Other aspects and advantages of the present invention can be seen upon review of the figures, the detailed description, and the claims which follow.

BRIEF DESCRIPTION OF THE DRAWINGS

FIG. 1 illustrates a mechanical representation of a typical prior art freely rotating potentiometer.

FIG. 2 is an electrical schematic of a typical prior art freely rotating potentiometer circuit.

FIG. 3 illustrates a voltage as a function of time as the wiper moves at constant speed once in each direction through the open wiper angle in a typical prior art freely rotating potentiometer circuit.

DETAILED DESCRIPTION OF THE INVENTION

Figure 4:
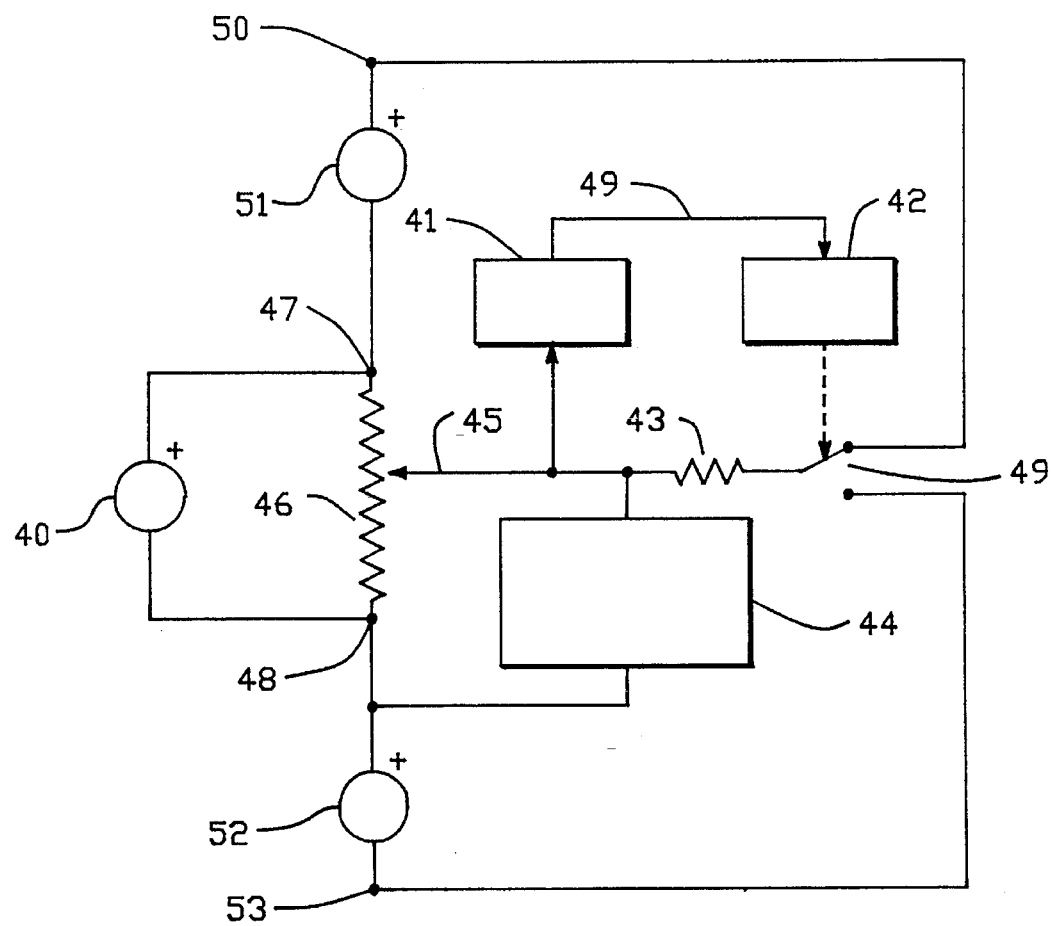
FIG. 4 is an electrical schematic representation of a freely rotating potentiometer circuit having a sensing device and driving device according to the present invention.

FIG. 4 is an electrical schematic representation of one embodiment of the present invention. Element 46, in an embodiment, is a substantially circular conducting element having uniform impedance per unit length. Element 46 is coupled to a planar substrate. The substrate is made of a insulating material. Tap 47 and tap 48 are positioned at opposite ends of the substantially circular conducting element to form a non-conducting region or an open wiper angle on the substrate. Other embodiments of conducting element 46 include a linear or straight line conducting element. In FIG. 4, element 46 is represented as a resistor. Tap 47 and tap 48 are represented as nodes coupled to element 46. Voltage source 40 is coupled to element 46 at taps 47 and 48. Tap 47 and tap 48 are also coupled to voltage sources 51 and 52, respectively. The terminals of switch 49 are coupled to node 50 and node 53.

Wiper 45, represented as an arrow, is selectively coupled to conducting element 46. Wiper 45 has one end coupled to a rotational center defined by a substantially circular conducting element 46. Wiper 45 in the preferred embodiment, is a rotatable linear conducting element allowed to have a wiper contact move from, at least, tap 47 to tap 48. As wiper 45 rotates, the wiper contact is electrically connected to element 45. As wiper contact 45 rotates around element 46, a voltage signal is asserted on wiper 45. The voltage signal on wiper 45 is measured by a voltage sampling measurement device 44 which is coupled to tap 48 and wiper 45.

Sensing device 41 is also coupled to wiper 45 and outputs a control signal on line 49 to driving device 42. In response to the control signal, driving device 42 toggles switch 49 to couple resistor 43 to node 50 or node 53. Resistor 43 is a so-called pulling resistor.

Sensing device 41 detects the proximity of wiper 45 to tap 47 or tap 48. Driving device 42 connects the non-wiper end of the resistor 43 to one of two nodes having voltages outside of the end of the CWR. If the wiper is near tap 47, then the non-wiper end of resistor 43 is connected to node 50. If the wiper is near tap 48, then the non-wiper end of resistor 43 is connected to node 53. However, the use of driving device 42 and switch 49 introduces a small step voltage error due to the switching of the non-wiper end of resistor 43 from a voltage outside of one end of the CWR to a voltage outside of the other end of the CWR.

Figure 5:
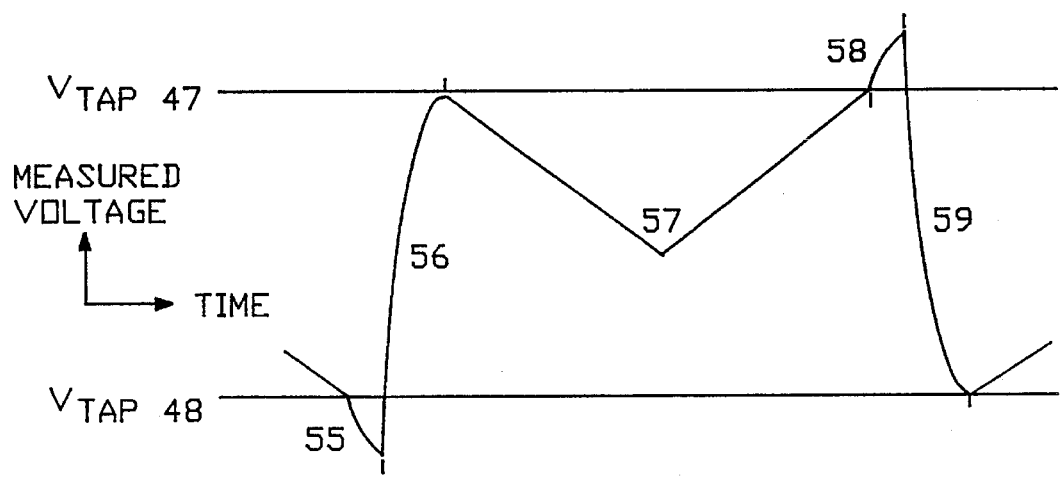
FIG. 5 illustrates a voltage as a function of time as the wiper moves at constant speed once in each direction through the open wiper angle according to the present invention.

Identification of dynamic states, or wiper 45 position, at tap 47 and tap 48 is achieved by switching the non-wiper end of a pulling resistor, or resistor 43, so that wiper voltage on wiper 45 always moves away from the CWR when it departs from the element 46 at either tap 47 or 48. This creates a characteristic slope of the voltage signal on wiper 45 as it departs from the element 46 at tap 47 or tap 48. The characteristic slope thus enables an identification of wiper 45 position. According to the present invention, there are two stable open wiper states and four dynamic open or just-closed wiper states. The two stable states are those in which wiper 45 remains in an open wiper angle or is electronically decoupled from element 46, and is 1) last touched by one tap or 2) last touched by the other tap. Depending on which-was the last tap touched by wiper 45, the voltage of wiper 45 will lie outside of the end of the CWR nearer to that tap, The four dynamic states are now symmetrically arranged in two pair, one at each tap. FIG. 5 shows a typical curve of measured voltage as a function of time for a wiper rotation at constant speed, once in each direction through the open wiper angle, according to the present invention.

Segment 55: Wiper 45 has departed from element 46 at tap 48. Identifiable: (−) slope; voltage out of CWR.

Segment 56: Wiper 45 has just reached tap 47. Identifiable: high (+) slope.

Segment 57: (the closed wiper state) Wiper 45 traces voltages within the CWR on element 46. Direction is reversed while in the CWR. Identifiable: low slope; voltage in the CWR.

Segment 58: Wiper 45 has departed from element 46 at tap 47. Identifiable: (+) slope; voltage out of CWR.

Segment 59: Wiper 45 has just reached tap 48. Wiper 45 has just reached tap 48.

Identifiable: high (−) slope. The ability to distinguish among the various states becomes very important if wiper 45 is changing direction frequently around an open wiper angle, as a great percentage of voltage readings will be when wiper 45 is in and around the open wiper angle. This is especially true when a freely rotating potentiometer is coupled to mechanical instruments with oscillating characteristics such as wind direction mechanisms in meteorological systems.

Figure 6:
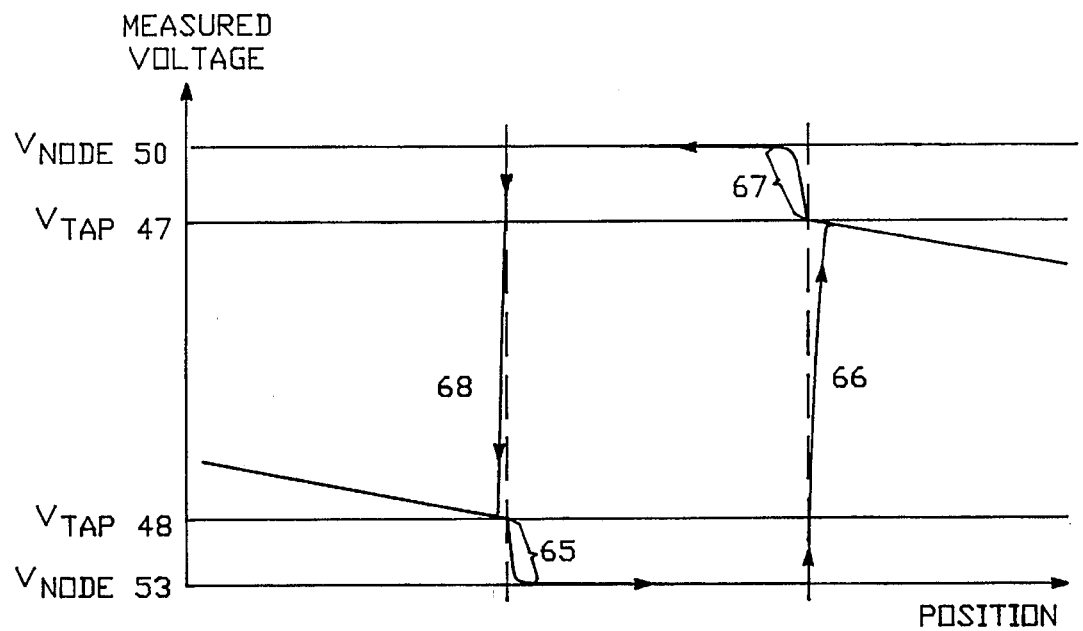
FIG. 6 illustrates voltage as a function of oscillating wiper position around the open wiper angle according to the present invention.
Figure 7:
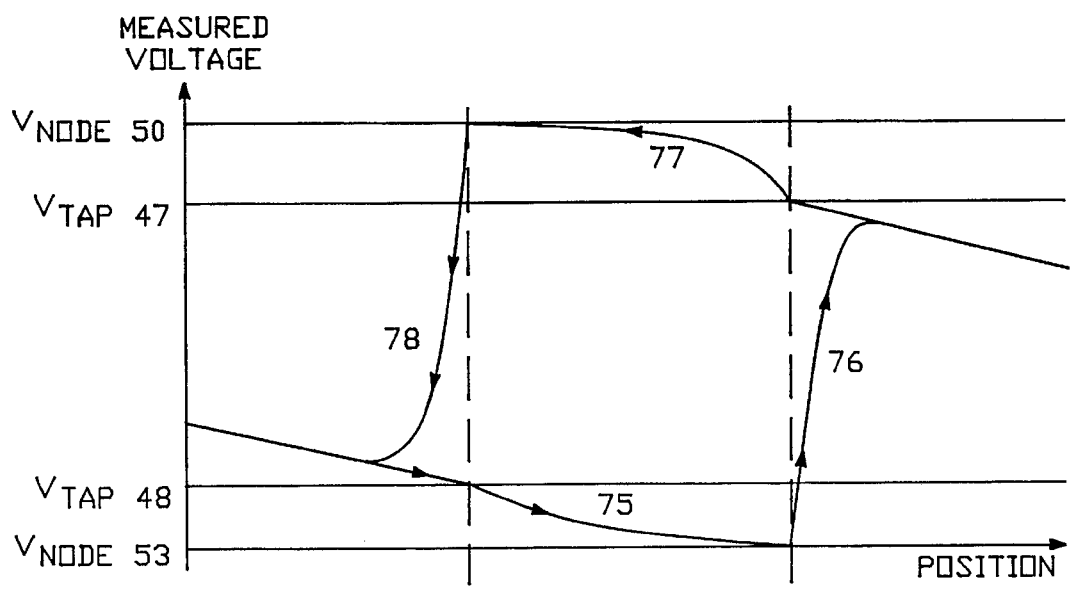
FIG. 7 illustrates voltage as a function of a high frequency oscillating wiper position around the open wiper angle according to the present invention.

FIGS. 6 and 7 show a voltage signal as a function of position of wiper 45 oscillating back and forth at constant speed through an open wiper angle, according to the present invention. FIG. 6 illustrates slower movement, which allows the existence of the two stable open wiper states. FIG. 7 illustrates the behavior for faster oscillation.

Segments 65 and 75: Wiper 45 has departed from element 46 at tap 48.

Segments 66 and 76: Wiper 45 reaches tap 47, traces voltages on element 46, and reverses direction of rotation.

Segments 67 and 77: Wiper 45 has departed from element 46 at tap 47.

Segments 68 and 78: Wiper 45 reaches tap 48, traces voltages on element 46, and reverses direction of rotation. The position of wiper 45 is identifiable for all states; although error increases with speed in the simple interpretation of segments 66, 68, 76 and 78 as representing the wiper on a tap position.

Figure 8:
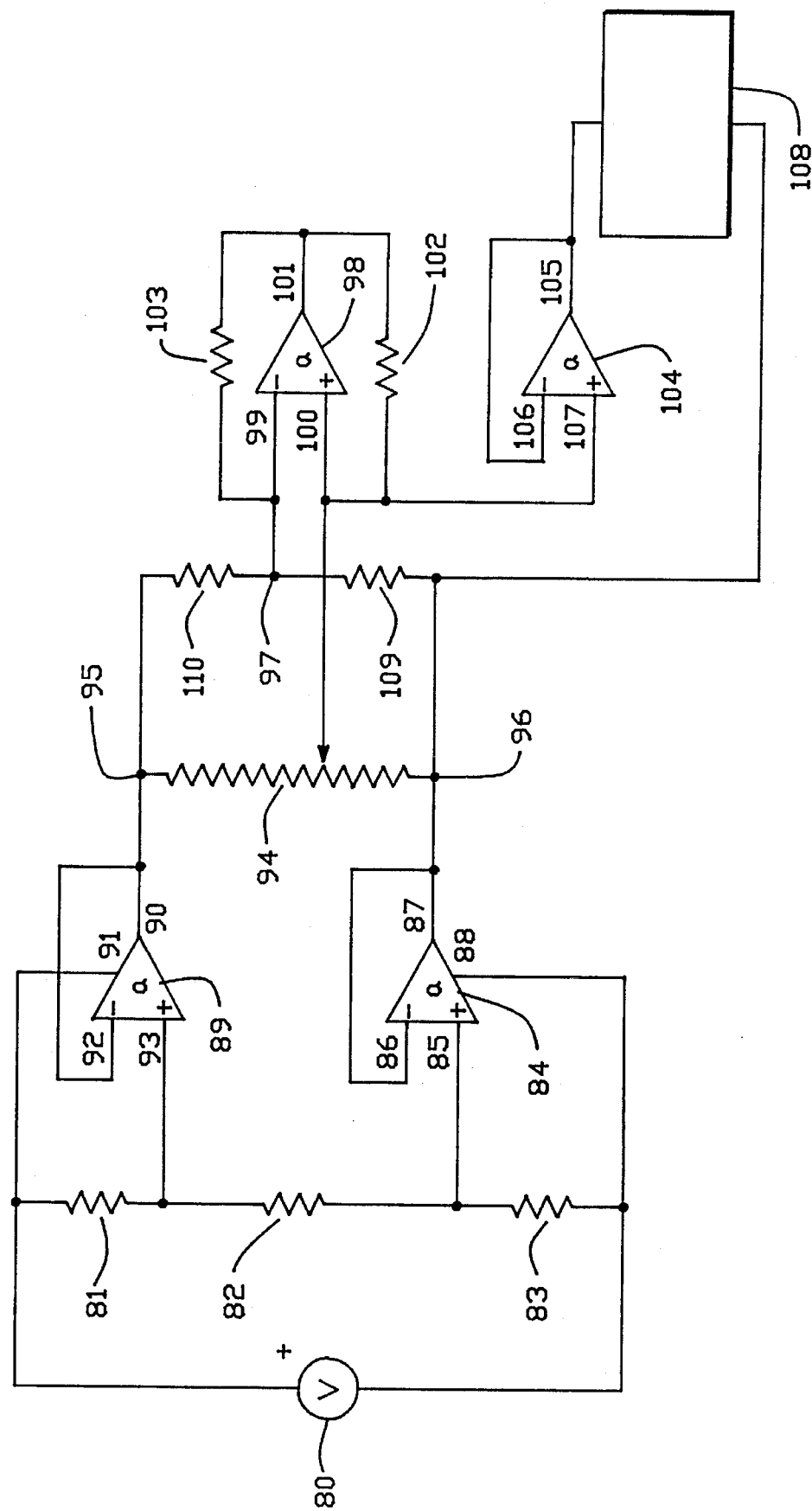
FIG. 8 is an electrical schematic having an operational amplifier and pulling resistor according to the present invention.

A further embodiment of the present invention is illustrated by a schematic in FIG. 8. Voltage source 80 is coupled to quadruply packaged operational amplifiers 98, 104, 84 and 89 at power supply inputs 88 and 91. Operational amplifiers 84 and 89 act as voltage buffers. Voltage source 80 is typically a 5-volt source with a positive terminal coupled to the positive power supply inputs of operational amplifier 89, 84, and 104. Voltage source 80 is also coupled to resistors 81 and 83. Resistors 81 and 83 are also coupled to resistor 82 and operational amplifier non-inverting inputs 93 and 85, respectively. Resistor 81, 82, and 83 are selected in order to properly scale voltage measurements for a desired application. Typically, these resistance values would be 2k, 2k and 1k Ohms, respectively. Operational amplifier inverting inputs 86 and 92 are coupled to outputs 87 and 90, respectively. Operational amplifier outputs 90 and 87 are coupled to tap 95 and tap 96, respectively. Typically, element 94 is 5k Ohm. In the preferred embodiment, element 94 is a substantially circular conducting element with tap 95 and tap 96 positioned at the opposite ends. Tap 95 and tap 96 form a non-conducting region or non-conducting angle. Tap 95 is coupled to resistor 110. Likewise, tap 96 is coupled to resistor 109. Both resistor 109 and 110 are coupled to operational amplifier inverting input 99. Resistor 110 and resistor 109 are typically 20k Ohms. Wiper 97, represented by an arrow, is coupled to operational amplifier non-inverting input 100. Operational amplifier inverting input 99 is coupled to resistor 103. Resistor 103 is then coupled to operational amplifier output 101. Operational amplifier non-inverting input 100 is coupled to resistor 102. Resistor 102 is then coupled to operational amplifier output 101.

In the preferred embodiment, resistor 103 is 1k Ohms and resistor 102 is 100k Ohms. Resistor 102 is a so-called pulling resistor. Operational amplifier non-inverting input 1 00 is also coupled to operational amplifier non-inverting input 107 of operational amplifier 104. Operational amplifier inverting input 106 is coupled to operational amplifier output 105. Operational amplifier output 105 is then coupled to voltage sampling measurement device 108. Voltage sampling measuring device 108 is also coupled to resistor 109 and tap 96.

Operational amplifier 98 generates a gain of 1.1, providing a smooth transition of the pulling resistor voltage throughout the wiper travel range, thus avoiding a step voltage error generated in the embodiment of FIG. 4. Error due to a pulling resistor is due to the current (i) flowing in the pulling resistor. The error is calculated by multiplying the current by the varying output resistance (r) at wiper 97. Thus, the voltage error equals (i) x (r). In the circuit shown in FIG. 8, a 100k Ohm pulling resistor causes negligible voltage measurement error.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments where chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A circuit, comprising:

a signal source;

a first conducting element having a first contact coupled to the signal source and having a second contact coupled to the signal source;

a second conducting element having a first contact coupled to the first conducting element, providing a first signal corresponding to a position of the second conducting element relative to the first conducting element during a decoupling of the second conducting element first contact from the first conducting element;

means, coupled to the second conducting element, for providing a second signal corresponding to the second conducting element first contact position during the decoupling responsive to the first signal, wherein the means for providing includes:

means, coupled to the second conducting element, for sensing the first signal; and, means, coupled to the sensing means, for driving the first signal to a reference signal level.

2. The circuit of claim 1, wherein the means for driving includes:

a switch, coupled to the signal source, providing the reference level.

3. (Presently amended) A potentiometer for determining a position of a wiper, comprising:.

a voltage source;

A substantially circular conducting element having a first tap coupled to the voltage source and having a second tap coupled to the voltage source, the first tap and the second tap forming a non-conducting region in between the first tap and the second tap;

a wiper, rotatably coupled to the substantially circular conducting element and non-conducting region, providing a first voltage signal corresponding to the position of the wiper relative to the substantially circular conducting element during the coupling of the wiper to the non-conducting region;

means, coupled to the wiper, for providing a second voltage signal corresponding to a wiper position responsive to the first voltage signa wherein the means for providing includes:

means, coupled to the wiper, for sensing the first voltage signal; and, means, coupled to the sensing means, for driving the first voltage signal to a reference voltage.

4. The potentiometer of claim 3, wherein the means for driving includes:

a switch, coupled to the voltage source, providing a reference voltage.

5. A potentiometer for determining a position of a wiper corresponding to a wind direction, comprising:

a voltage source;

a substantially circular conducting element having a first tap coupled to the voltage source and having a second tap coupled to the voltage source, the first tap and the second tap forming a non-conducting angle region in between the first tap and the second tap;

a wiper, rotatably coupled to the substantially circular conducting element and the non-conducting angle region, providing a first voltage signal corresponding to the position of the wiper relative to the substantially circular conducting element during the coupling of the wiper to the non-conducting angle region;

means, coupled to the wiper, for sensing the first voltage signal; and means, coupled to the sensing means and voltage source, for driving the first voltage signal to a reference voltage, responsive to the first voltage signal, generating a second voltage corresponding to the wind direction.

6. The potentiometer of claim 5, wherein the means for driving includes:

a switch, coupled to the voltage source, providing the reference voltage.

7. A potentiometer for determining a position of a wiper corresponding to a wind direction, comprising:

a voltage source;

a substantially circular conducting element having a first tap coupled to the voltage source and having a second tap coupled to the voltage source, the first tap and the second tap forming a non-conducting angle region in between the first tap and the second tap;

a wiper, rotatably coupled to the substantially circular conducting element and the non-conducting angle region, providing a first voltage signal corresponding to the position of the wiper relative to the substantially circular conducting element during the coupling of the wiper to the non-conducting angle region; and an amplifier, having a first input coupled to the voltage source and a second input coupled to the wiper and an output coupled to the voltage source, providing a second voltage signal corresponding to the wind direction.

* * * * *